Nov. 13, 1962 H. C. MEDLEY 3,063,351

XEROGRAPHIC POWDER IMAGE TRANSFER APPARATUS

Filed Sept. 10, 1959 6 Sheets-Sheet 1

INVENTOR.
Harold C. Medley

BY [signature]

ATTORNEY

Nov. 13, 1962 H. C. MEDLEY 3,063,351

XEROGRAPHIC POWDER IMAGE TRANSFER APPARATUS

Filed Sept. 10, 1959 6 Sheets-Sheet 2

INVENTOR.
Harold C. Medley

BY [signature]

ATTORNEY

Nov. 13, 1962 H. C. MEDLEY 3,063,351

XEROGRAPHIC POWDER IMAGE TRANSFER APPARATUS

Filed Sept. 10, 1959 6 Sheets-Sheet 3

INVENTOR.
Harold C. Medley
BY [signature]
ATTORNEY

INVENTOR.
Harold C. Medley
BY [signature]
ATTORNEY

INVENTOR.
Harold C. Medley
BY Norman E. Schrader
ATTORNEY

INVENTOR.
Harold C. Medley
BY [signature]
ATTORNEY 3,063,351
XEROGRAPHIC POWDER IMAGE TRANSFER APPARATUS

Harold C. Medley, San Diego, Calif., assignor, by mesne assignments, to Xerox Corporation, a corporation of New York Filed Sept. 10, 1959, Ser. No. 839,251
13 Claims. (Cl. 95—1.7)

This invention relates to the field of xerography and particularly to improved apparatus for effecting rapid transfer of a xerographic powder image from a xerographic plate to a support surface.

More specifically, this invention relates to improved apparatus for rapidly effecting xerographic reproduction of an original to be reproduced wherein the original may constitute a video radar image formed on the screen of a radar oscilloscope which must rapidly and repeatedly be permanently reproduced for viewing and evaluation.

In the process of xerography, as disclosed in Carlson Patent 2,297,691, issued October 6, 1942, a xerographic plate comprising a layer of photoconductive insulating material on a conductive backing is given a uniform electric charge over its surface and is then exposed to the subject matter to be reproduced, usually by conventional projection techniques. This exposure discharges the plate areas in accordance with the light intensity that reaches them, and thereby creates an electrostatic latent image on or in the photoconductive layer. Development of the latent image is effected with an electrostatically charged, finely divided material such as an electroscopic powder that is brought into surface contact with the photoconductive layer and is held thereon electrostatically in a pattern corresponding to the electrostatic latent image. Thereafter, the developed xerographic powder image is usually transferred to a support surface to which it may be fixed by any suitable means.

Various means are proposed in the referred-to Carlson patent for transferring a xerographic powder image onto a support surface dependent upon the type of powder employed and the substance material of the support surface. For example, it is suggested that an adhesive surfaced paper might be used as the support surface and that the adhesive side thereof be pressed firmly in contact with a powdered image to effect transfer. Wax or paraffin are typically recommended forms of adhesive. Where the image is formed of a powder or dye soluble in water or other liquid, a support surface wetted with a suitable solvent may be applied firmly in contact with the formed image to effect transfer.

As the art of xerography has progressed, preferred materials and practices have been evolved for developing and transferring of xerographic powder images. Typically, where xerography is directed toward line-copy reproduction such as black letters on a white background, a form of two-component developer is preferred which may be of the type disclosed in Walkup Patent 2,638,416 and transfer is effected preferably by employing an apparatus for generating electrostatic attraction to the support surface which may be of a type of apparatus disclosed in Walkup Patent 2,777,957. Where xerography is directed toward continuous-tone reproduction, similar to an ordinary silver halide photograph, a developing material of finely divided charcoal is preferred which may be of the type disclosed in copending application Serial No. 484,000, filed January 25, 1955, now Patent No. 2,899,331, in the name of R. E. Hayford, which is suspended in a gas in the form of a powder cloud and supplied to an electrostatic latent image on a plate to form a powder image. An early form of such development is disclosed in Carlson Patent 2,221,776. After development, transfer of continuous tone images is usually effected by a form of adhesive transfer.

An apparatus to effect adhesive transfer is disclosed in Mayo et al. Patent 2,661,289, wherein transfer support material having a surface tacky-smooth at room temperature is applied to the powder image on a moving xerographic plate whereafter it is removed therefrom with the image adhering to the transfer material. Fixing is then effected by rolling a protective web of transparent or translucent sealing material against the tacky image-bearing surface of the transfer material sustaining the image therebetween.

Radar, in general, is an application of radio principles by which it is possible to detect the presence of objects and to determine their direction and range. It is of extreme importance for providing continuous flow of accurate information where a functional operation is dependent upon knowledge obtained therefrom. Detection is accomplished by directing a beam of radio frequency energy over a region to be searched. When the beam strikes a reflecting object, energy is reflected, a small part of which is returned through an antenna to the radar system. A sensitive receiver can detect the echo signal which is reproduced as a video pulse onto the screen of an oscilloscope tube where it may be viewed for interpretation.

A sweep, formed of an electron beam moves from the center of the screen radially outwardly whereby the sweep position is controlled by and synchronized with the antenna position throughout 360° rotation. The elapsed time for 360° rotation varies, depending upon the application and distance range of objects sought to be detected. The pulses produce signals of varying density dependent upon the strength of signal received. Because of density variation that can be expected from numerous signals, the varying shades of contrast appear more nearly similar to "continuous tone" type of original as previously referred to.

Whereas radar systems vary greatly as to detail, principles of operation are essentially the same for all systems. All signals received must be interpreted by an operator trained in the use of radar equipment. The speed required to interpret radarscope reflections is principally a function of the exigency of the particular situation for which the radar is being employed, as for example, where fighter aircraft is to be directed to the vicinity of enemy planes, repeatedly rapid and accurate interpretation must be effected. Heretofore a record of what has transpired on the screen over a course of time is dependent upon notes taken and the memory of the operator, Wherein an exigent situation arose information was quickly jotted and then disseminated for an interpretation.

Recording of radarscope images has long been desired provided recording could be achieved of satisfactory quality and in a satisfactory manner. To be feasible, such a device should be capable of processing from exposure to finished print in less than 15 seconds. The image preferably should be affixed to a white support material that retains the image sharpness, does not smear on handling and is amenable to making notes thereon. The apparatus should have sufficient flexibility to record the radarscope images appearing periodically in an automatic mode of operation or in random rotations of the radar antenna in a manual mode of opertion. The full 360 degrees of sweep rotation requiring about 3 seconds to effect must be recorded. The apparatus must be efficient and compact utilizing a minimum of space.

Continuous tone powder images can be transferred, as previously stated, to either moist dye transfer paper or forms of adhesive coated paper. However, neither has been found satisfactory for use in recording radarscope images. Dye transfer paper is not dimensionally stable because it curls and shrinks upon drying while adhesive coated papers have a tendency to adhere to themselves in rolls and have poor ageing qualities becoming yellow after exposure to light and air. Additionally, both materials on transfer tend to soil the photoconductive coating on a xerographic plate. Preferred forms of transfer support material are types of polyethylene coated paper disclosed in Van Dorn Patents 2,855,324 and 2,886,464, which have an absence of any apparent adhesive qualities. Under an applied pressure, however, preferably between 100–400 pounds, charcoal powder will adhere to the polyethylene and an application of heat will soften the polyethylene coating sufficiently to effect a fusing of the powder image thereto at temperatures below which damage to the charcoal would otherwise occur.

With the apparatus of the invention, transfer of a xerographic powder image from a xerographic plate to a support surface and fixing of the image thereto can be effected in approximately three seconds. When the apparatus of the present invention is used in combination with a form of the xerographic camera disclosed in Bixby et al., Patent 2,831,409, the finished picture can be displayed within approximately 12.5 seconds after the processing cycle begins, the process cycle beginning with exposure and being completed after the xerographic plate has been thoroughly cleaned and in position for start of the next cycle.

The principal object of this invention is to improve transfer of a xerographic powder image from a xerographic plate to a support surface.

A further object of the invention is to provide apparatus for rapid xerographic reproduction of originals to be reproduced.

A further object is to provide a compact and convenient xerographic apparatus for charging, exposing, developing, transferring and fixing to effect xerographic reproduction.

A further object is to provide xerographic reproduction apparatus that is simple and compact in use and in structure and efficient in operation.

These and other objects are attained with the apparatus of the invention as will be apparent from the following description.

A preferred form of the invention is embodied in the accompanying drawings, in which.

Figure 1:
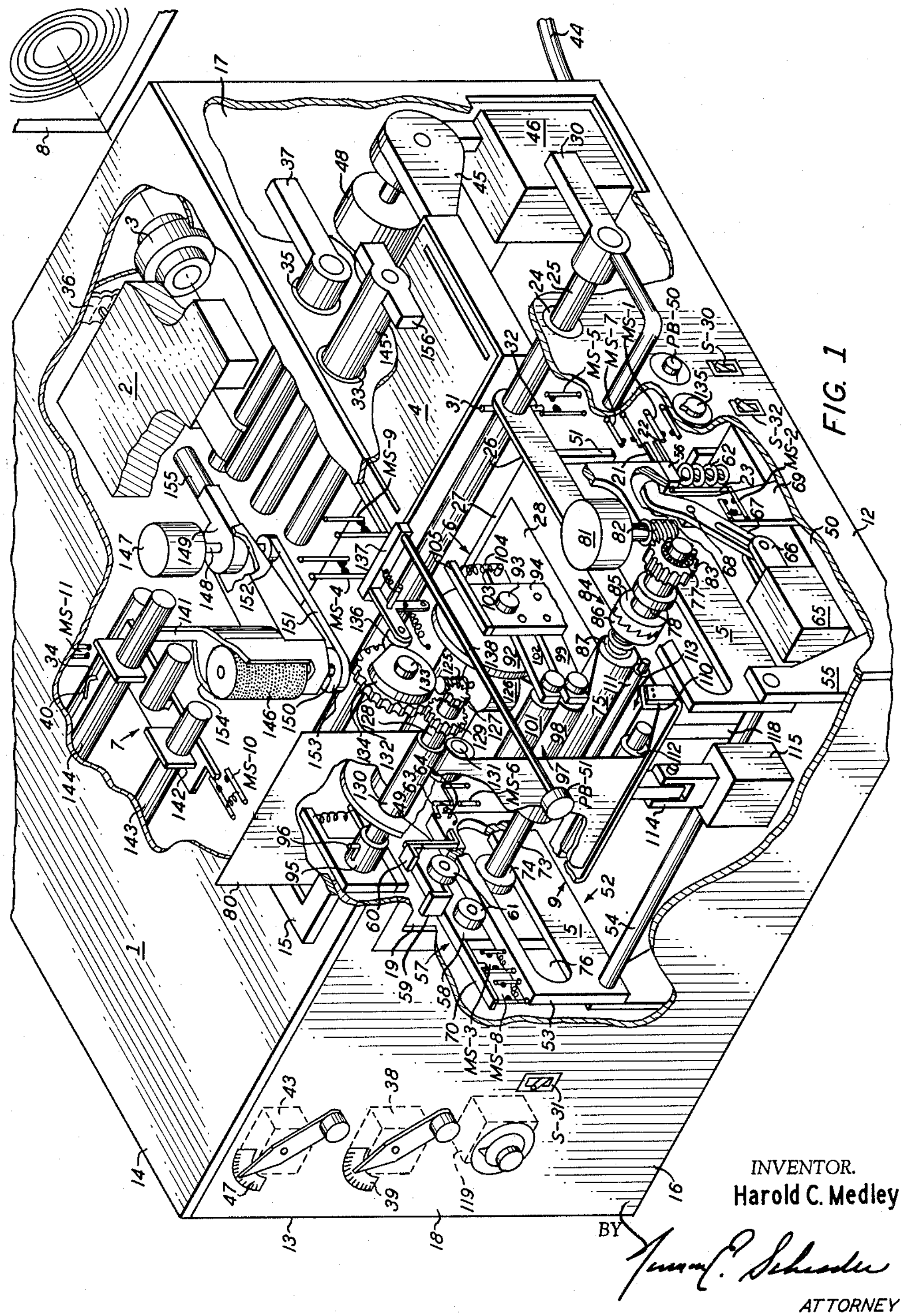
FIG. 1 is an isometric view of the apparatus of the invention partially broken away to illustrate the operative relation of the component parts.

In the form of apparatus shown in the drawings, the invention includes a light-tight box 1 for housing all components thereof, a corona charging unit 2 for electrostatically charging a xerographic plate, a lens and shutter arrangement 3 to expose a previously charged xerographic plate to a radar image 8 to be reproduced, a developing unit 4 to effect a xerographic powder image development of an electrostatic image on the xerographic plate, a transfer assembly 5 to effect transfer of a xerographic powder image from a xerographic plate to a support surface, a cleaning unit 7 to clean a spent xerographic plate, fusing means 9 to permanently affix a transferred xerographic powder image to a support surface, and all appurtenances to effect the sequential functioning of the apparatus.

Figure 2:
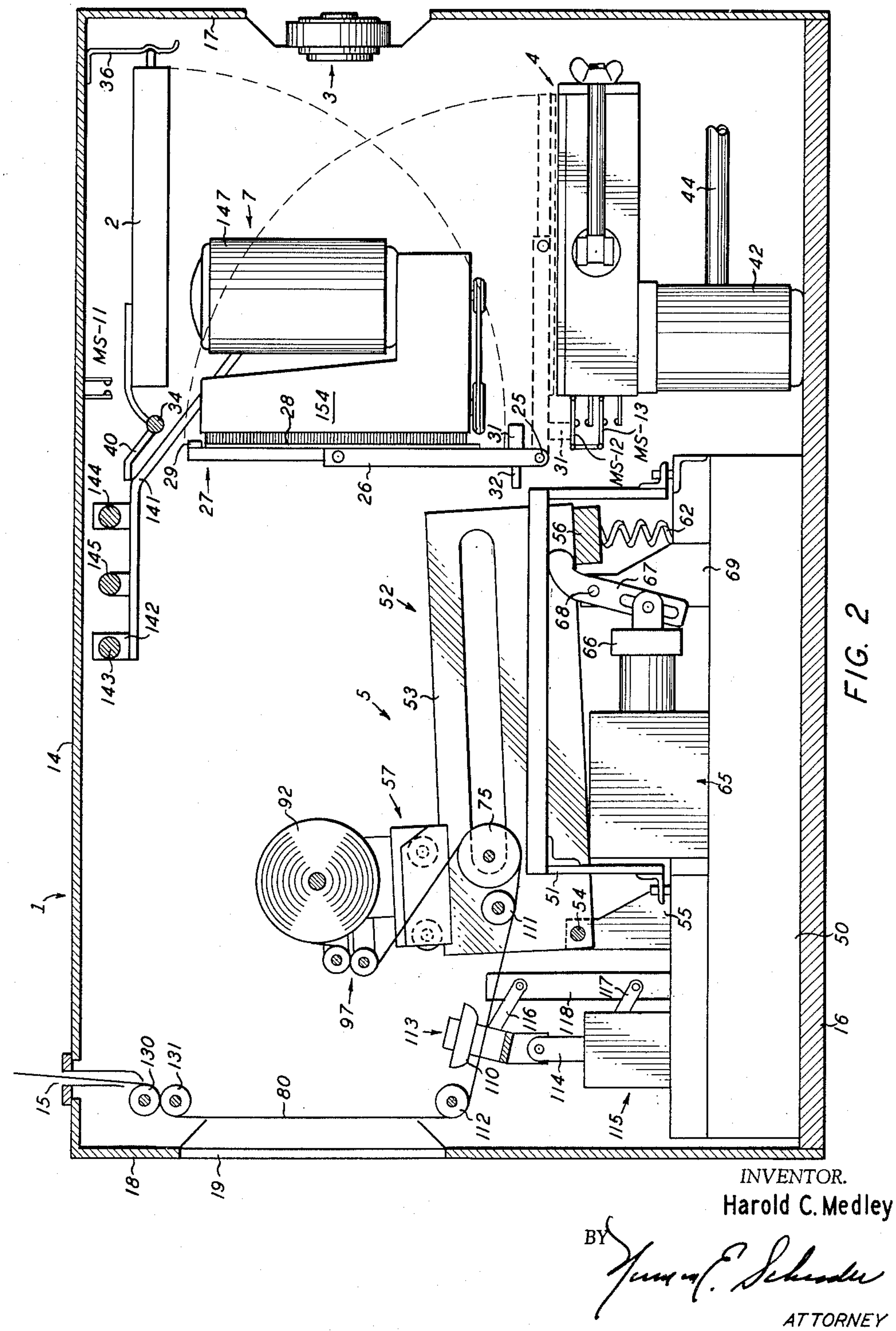
FIG. 2 is a side section view of the apparatus illustrating the operative relation of a xerographic plate in charging, exposure, developing and cleaning positions.
Figure 3:
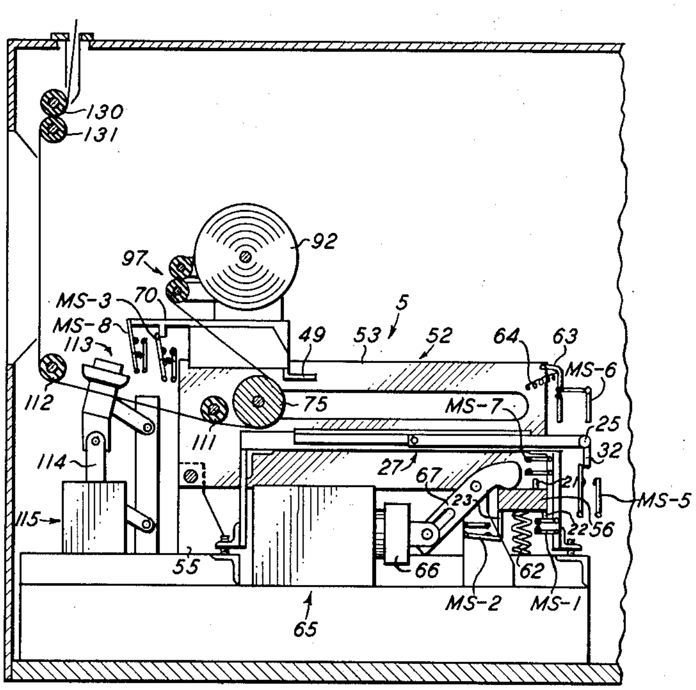
FIG. 3 is a side section view similar to FIG. 2 illustrating the apparatus at the start of a transfer cycle with a xerographic plate in transfer relation.

For housing of components hereof (see FIGS. 1 and 2) light-tight, box-like structure 1 is comprised of side walls 12 and 13, top wall 14 which includes paper ejection slot 15, bottom wall 16, front wall 17 in which is mounted any suitable lens and shutter means 3, and rear wall 18 which includes a display window 19. Journaled in suitable bearings 24 in side walls 12 and 13 is a transverse shaft 25 that is mounted in a manner to have its axis of rotation parallel to a plane of the focal plane of the lens element 3. Fixed on shaft 25 are a pair of vertically extending angle members 26 that serve to support plate holder 27 which is provided with suitable internal grooves on its side and bottom rails to support a xerographic plate 28 therein. An upper rail 29 is provided to retain xerographic plate 28 in position in holder 27. Handle 30 is secured to the outwardly extending end of shaft 25 whereby the shaft with holder 27 and xerographic plate 28 secured thereto may be positioned as indicated in FIG. 2 of the drawings for charging, exposing and/or cleaning operations or may be rotated in a clockwise direction through an angle of approximately 90 degrees for developing operations or may be rotated 180 degrees counterclockwise from said developing operation into transfer relation as shown in FIG. 3. Preferably, plate holder 27 is formed of a suitable insulating material to permit the application of a biasing voltage during the developing cycle if desired.

In order to place a uniform electrostatic charge on xerographic plate 28, the apparatus of the invention includes corona charging unit 2 which, for convenience, may be of the type described in copending application Serial No. 495,945, filed March 22, 1955, now Patent No. 2,932,-742, in the name of James P. Ebert. In the alternative, other charging means such as a type employing radioactive discharge of the form disclosed in Carlson Patent 2,701,764, may be substituted for corona charging unit 2.

Charging unit 2 is secured to transverse shaft 34 which is journaled in suitable bearings 35 mounted in side walls 12 and 13, for rotation about an axis that is parallel to a plane of the focal plane of lens element 3. When the charging unit 2 is inactive it is held in a substantially horizontal position by a suitable resilient detent 36 that is secured from top wall 14. When the charging unit 2 is to be rendered operative for charging purposes, shaft 34 is rotated clockwise by handle 37 secured to the outwardly extended end of shaft 34 until charging unit 2 is vertically in a plane parallel to xerographic plate 28. This places charging unit 2 in proper spaced relation to xerographic plate 28 and simultaneously closes microswitch MS–11 from contact with protrusion 40 secured to 34 thereby energizing the charging unit through variable pre-set timer control 38 to generate a uniform electrostatic charge on xerographic plate 28. After charging of the xerographic plate has been effected the operator returns the charging unit 2 to a substantially horizontal position as indicated in FIG. 2. Plate 28 is then ready for exposure to a light image of an original to be reproduced.

Exposing of a light image to be reproduced to xerographic plate 28 is effected in a conventional manner by means of lens and shutter elements 3 which after exposure an electrostratic latent image is formed on the plate corresponding to the image exposed. As soon as exposure is completed handle 30 is rotated clockwise to engage xerographic plate 28 with the developing unit 4 simultaneously closing microswitches MS–12 and MS–13 from nipple 31 so that the developing cycle is immediately initiated.

Figure 8:
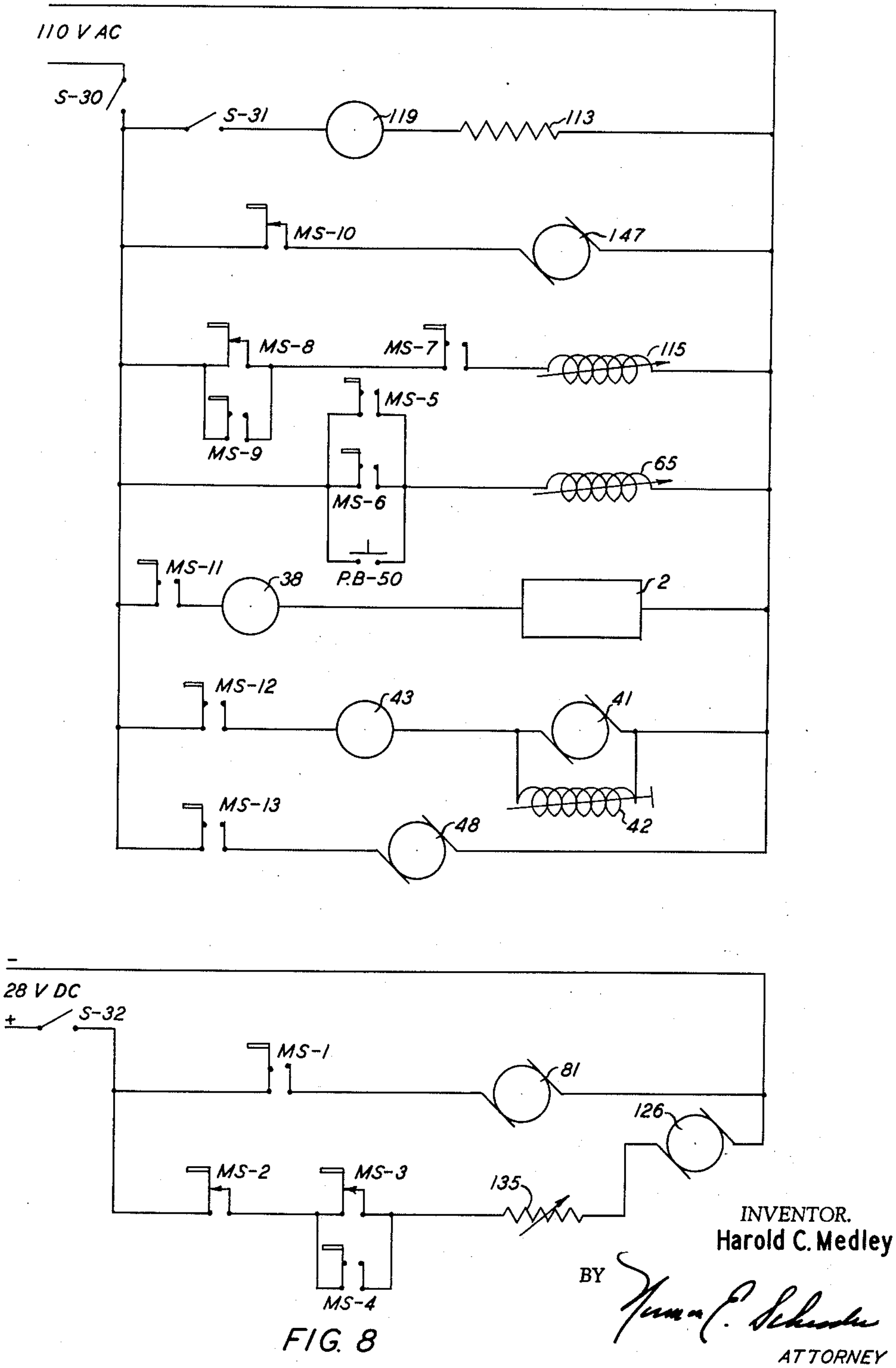
FIG. 8 is a wiring diagram.

With the developing cycle initiated drive motor 41 (see also FIG. 8) and solenoid air valve 42 of powder cloud developing unit 4 are energized from closing of MS–12 through variable pre-set timer control 43 and blower exhaust motor 48 is energized from closing of MS–13. Various types of powder cloud developing units may be employed, typical of which are disclosed in Matthews Patent 2,877,132 and Ricker Patent 2,824,545. In a preferred embodiment, a powder cloud development unit is employed utilizing a powder impregnated belt (not shown) which may be of a type disclosed in Andrus et al. Patent 2,815,330 for generating a powder cloud, whereby compressed air is introduced through hose 44 at a regulated pressure through solenoid air valve 42 so that air in contact with a moving powder impregnated belt blows the powder therefrom producing a controlled aerosol of powder particles. The powder is then dispersed by the developing unit in relation with an electrostatic latent image on xerographic plate 28 effecting a powder image development thereof. Spent powder from the developing unit is exhausted therefrom by motor operated exhaust blower 45 which discharges the spent powder into filter-collector 46. After development is completed, handle 30 is rotated counterclockwise to engage xerographic plate 28 with the transfer assembly 5 momentarily closing microswitch MS–5 from contact with nipple 32 and immediately initiating the transfer cycle.

Transfer of a xerographic powder image is effected from a xerographic plate 28 to transfer support material 80 which is supported and transported by components of transfer assembly 5 which includes a replaceable roll 92 of webbed transfer support material 80 secured to lateral shaft 93 rotatably supported at each end by a pair of vertical support legs 94 secured to support base 50. Roll 92 is easily removed and replaced by sliding shaft 93 from pin 96 secured thereto into the hollow of shaft 95 against the yieldable mean (not shown) applied to the end of shaft 93. A restraint is created against the transporting of transfer material 80 from roll 92 by restraining rolls 97 comprising a roller 98 rotatably secured between cantilevered arm brackets 99 secured to support legs 94 and roller 101 rotatably secured between cantilevered arm brackets 102 which are pivotally secured through pin 103 to support legs 94. A drag restraint is maintained by a pair of springs 104 under tension between 102 and protrusion 105 secured to 94 acting to raise the rear of 102 and causing roller 101 to engage transfer material 80 against roller 98.

From roll 92, transfer material 80 is threaded through the restraining rolls 97 partially around roller 75 and under guide rolls 111 and 112 which sustain transfer material 80 in relation to fusing means 9 wherefrom it is threaded behind window 19 to between ejection rolls 130 and 131 and out ejection slot 15. When not transporting, ejection rolls 130 and 131 frictionally engaged act to restrain transfer material 80 therebetween.

Figure 4:
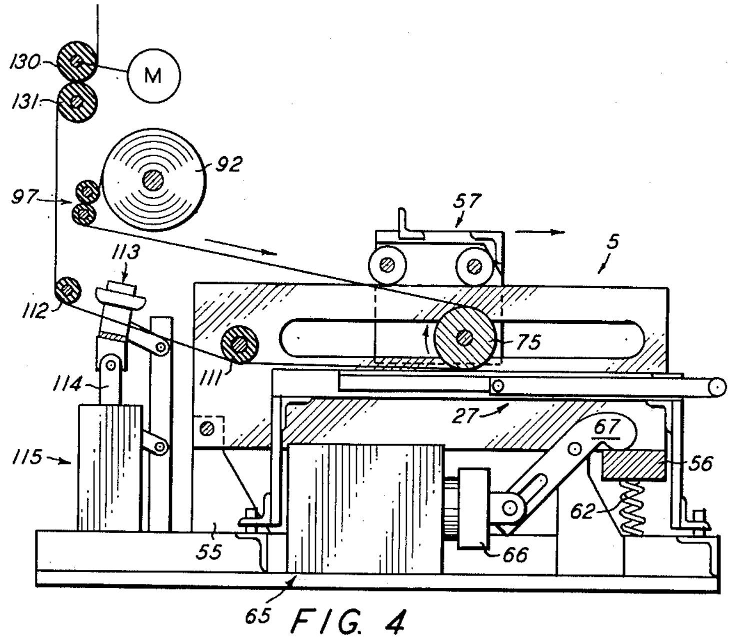
FIG. 4 is similar to FIG. 3 but illustrates the apparatus in an intermediate position of the transfer cycle applying transfer material against a xerographic plate.

For effecting transfer of a powder image from plate 28 to a transfer support material 80, transfer assembly 5 also includes a support base 50 supported on bottom wall 16 to which is secured a support stand 51 arranged for supporting plate holder 27. Arranged so as to support a cylindrical roller 75 spanning the width of a plate on stand 51, is support frame 52 comprised of parallel guide supports 53 pivotally joined at their rearward end through rod 54 rotatably secured to stand 55 in turn secured to base 50 and joined at their forward end by bar rail 56 extending laterally through the hollow center of stand 51. Movably supported by rollers 61 on guide support 53 is carriage 57 which serves to provide traveling support for motor 81 and roller 75 and consists of a pair of braces 58 joined by angles 59 and 60 vertically extending on the exterior sides of support frame 52. Spring 62, compressed between bar 56 and base 50, functions to maintain frame 52 inclined upwardly from pivot rod 54. When transfer is to be effected, the forward end of support frame 52 is drawn downward toward the xerographic plate by the closing of MS–5 which energizes solenoid 65 secured on base 50 which includes a plunger 66 secured to crank arm 67 in turn arranged to pivot about pin 68 rotatably supported in bracket 69. The upper nose of crank arm 67 seating on the top side of bar 56 maintains the bare uppermost position and when withdrawn by the action of solenoid 65 depresses bar 56 and frame 52. With support frame 52 drawn downward by the energizing of solenoid 65, roller 75 is drawn against an end of an image-bearing surface of xerographic plate 28 acting along a line of tangent contact to pressure support material against the plate surface. Pressure roller 75 is secured to lateral shaft 73 and when driven from motor 81 is propelled under sustained pressure drawing transfer material 80 from roll 92 by overcoming the restraint exerted by restraining rolls 97 and applying material against the powder image on xerographic plate 28 as may be seen in FIG. 4. Shaft 73 is rotatably secured to braces 58 being rotatably supported at one end in bearing 74 in slot 76 and rotatably supported at its other end by a pair of bearings 77 (not shown) within the hollow of shaft 78. In preferred embodiment, roller 75 is of hardened steel having a durable rubberized surface in contact against the backside of transfer material 80.

Figure 5:
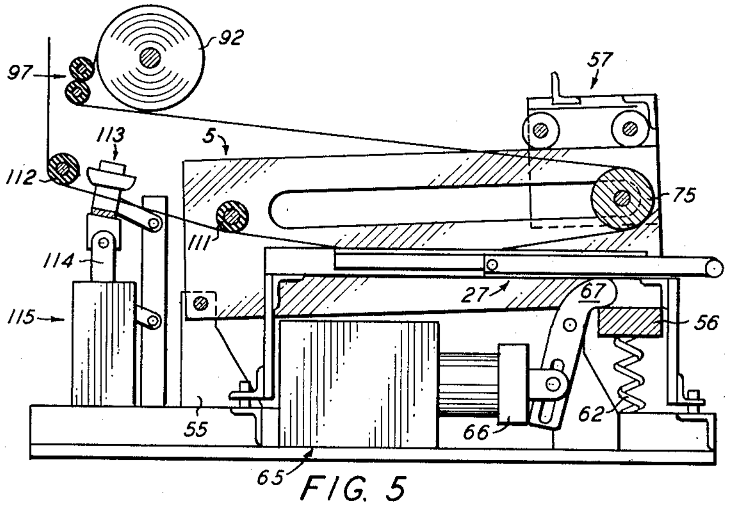
FIG. 5 is similar to FIG. 3 but illustrates the apparatus at the end of a transfer cycle with transfer material being stripped away from a xerographic plate.
Figure 7:
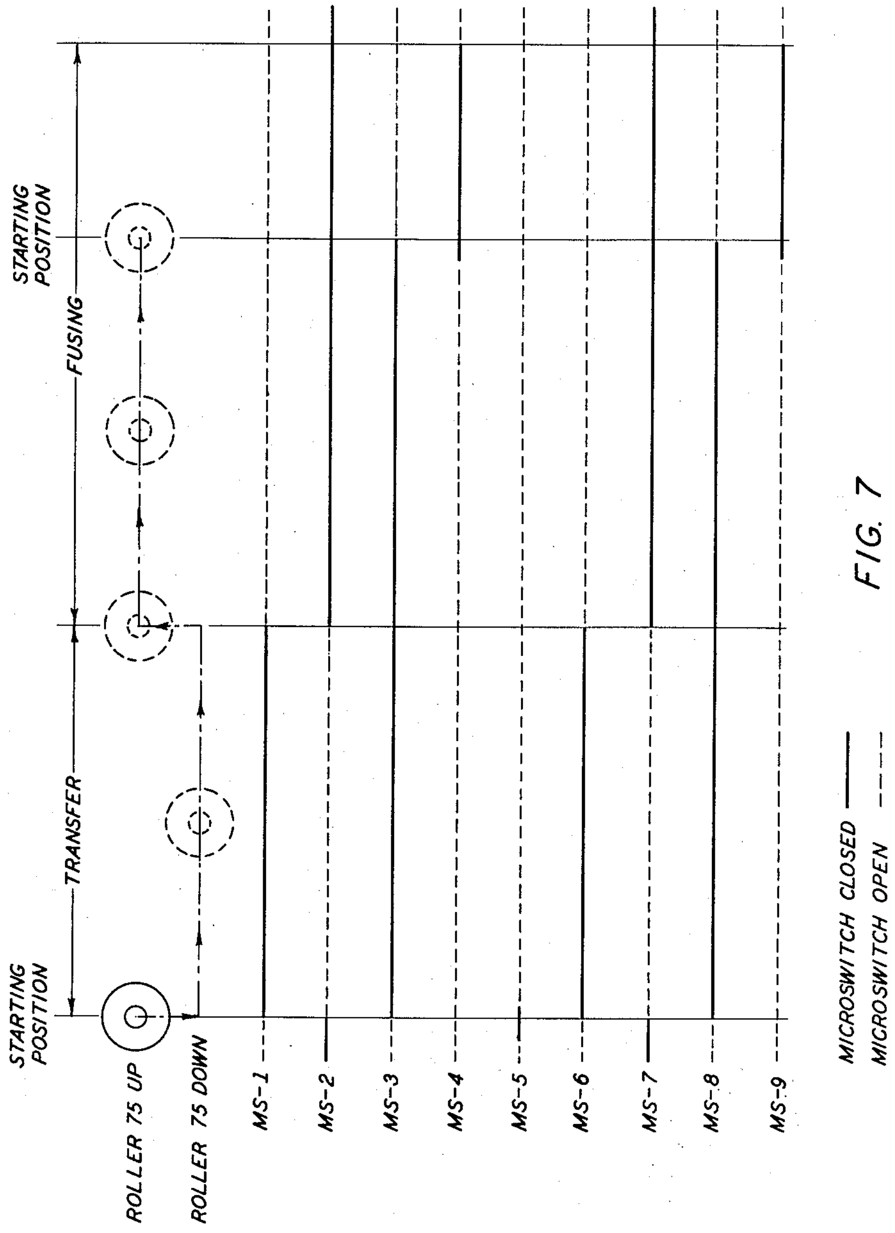
FIG. 7 is a schematic timing diagram of microswitch sequence.

To propel roller 75, worm 82 secured to the shaft of transfer roll motor drive 81 is continuously engaged to mesh with worm gear 83 secured to shaft 78. Shafts 73 and 78 are joined through a common form of jaw clutch 84 which may be of a type described in Kent's Mechanical Engineer Handbook, 12th Edition, volume "Design and Production." Jaw 85 of 84 is secured to shaft 78 while jaw 86 is slidably secured to shaft 73 and is held to engage jaw 85 by spring 87 compressed around shaft 73 and between the end of roller 75 and the rear of jaw 86. The angle of mesh between teeth of jaws 85 and 86 permit jaw 85 to drive jaw 86 in a clockwise direction as viewed from the motor end whereas rotation of roller 75 can be effected clockwise independent of the drive arrangement by jaw 86 retractably slipping on jaw 85 against spring 87. After material 80 has been applied the length of plate 28, solenoid 65 is released by opening MS–6 from lip 49 secured on carriage 57 such that support frame 52 is restored to its inclined relation by the resilient action of spring 62, elevating roller 75 and effecting partial separation of material 80 from plate 28 as may be seen in FIG. 5.

Figure 6:
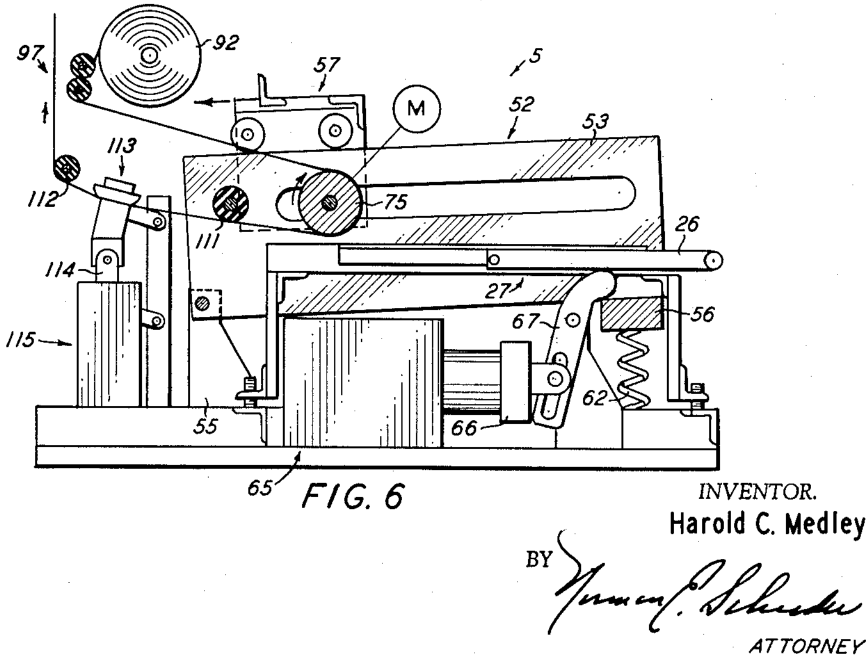
FIG. 6 is similar to FIG. 3 but illustrates transporting of transfer support material in fixing relation.

Complete separation of web material 80 from plate 28 with a powder image adhering to the web is effected by transporting web through ejection rolls 130 and 131 as may be seen in FIG. 6. With frame 52 inclined microswitch MS–1 is permitted to close energizing transport drive motor 126 from which worm 125 secured to its drive shaft and meshing with worm gear 127 secured to rotatable shaft 128 transmits the driving force thereto. Ejection roll 130 secured to shaft 128 is rotated thereby, advancing web 80 thereagainst. As web 80 is transported it rotates roller 75 by slipping on clutch 84 as aforesaid and draws the roller back until restored to starting position. Thereafter, continued transport of the web draws it from spool 92 overcoming the restraint of restraining rolls 97. Also secured to shaft 128 is pinion 129 meshing with timing gear 132 secured on a common shaft 133 with cam 134. As shaft 133 is rotated, cam 134 through follower 136 and bar 137, actuates microswitches MS–4 and MS–9 respectively to effect operation as will be described in the operational sequence.

Fusing of the powder image to web 80 is effected by the application of heat thereto from fusing means 9 while the latter is in transport as may also be seen in FIG. 6. Simultaneous with the energizing of drive motor 126, microswitch MS–7 is closed from the up position of projection 21 and fusing means is rendered operative by the energizing therefrom of fuser solenoid 115 secured at base 50 whereby plunger 114 draws fuser platen 113 downward onto the back side of web 80. Platen temperature is maintained constant by variable thermostat 119 having its dial setting located on back wall 18. Parallel arms 116 and 117 pivotally secured at one end to post 118 are hinged to platen 113 and plunger 114 respectively to move the platen into fusing relation with web 80.

For cleaning a spent xerographic plate 28 after transfer of the power image has been effected therefrom and the plate is restored to the position shown in FIG. 2, the apparatus of the invention includes plate-cleaning unit 7. The entire unit is secured to slidable shaft 145 and supported from bracket 141 and clips 142 to parallel horizontal shafts 143 and 144 each secured in side walls 12 and 13 of box 1. Pulling handle 156, secured to shaft 145, outwardly away from side wall 12 through journal 33 actuates microswitch MS–10 closed energizing motor 147 and engages cleaning brush 146 enclosed in housing 154 against the photoconductive surface of xerographic plate 28. Motor 147 through its drive shaft 148 when energized, drives exhaust blower 149 and rotates shaft 150 secured to brush 146 through belt 151 in tension between pulleys 152 and 153 secured to shaft 148 and 150 respectively. Powder removed is brushed into housing 154 wherefrom it is exhausted by blower 149 to a replaceable collection bag 155.

In operation (see all figures) the apparatus is arranged in fixed relation to an image 8 to be reproduced. Manually operated electrical switches S–30, S–31 and S–32 are all closed to provide connection of the apparatus to an appropriate potential source. Charging unit 2 is rotated into juxtaposition with xerographic plate 28 and in doing so microswitch MS–11 is closed by protrusion 40 secured to shaft 34 energizing charging unit 2 for a presettable time controlled charging of plate 28 as determined by dial setting 39 of timer 38. When charging is complete, unit 2 is swung to its horizontal position by handle 37 and exposure of an image to be reproduced is made by means of lens and shutter element 3. Immediately after exposure, handle 30 is rotated clockwise to press xerographic plate 28 into developing relation with developing unit 4 and in doing so microswitches MS–12 and MS–13 are each closed by nipple 31 secured to vertical angle 26 thereby activating developing unit 4 by respectively energizing air valve 42 and motor 41 for a presettable controlled time as determined by dial setting 47 of timer 43 and energizing of blower motor 48.

After development, handle 30 is rotated counterclockwise to place xerographic plate 28 in transfer relation on support stand 51 and in doing so microswitch MS–5 is momentarily actuated closed by nipple 32 on shaft 25 thereby initiating the transfer cycle. Solenoid 65, energized by MS–5, serves through its action on crank arm 67 to depress bar rail 56 downward causing roller 75 to place transfer material 80 in pressure contact against the end of plate 28 and placing the assembly 5 into transfer relation. With support frame 52 in transfer relation, microswitch MS–6 is actuated closed from pawl 63 pivotally secured to the end of guide 53 sustaining solenoid 65 energized. Simultaneously, microswitch MS–1 is actuated closed from protrusion 21 on bar rail 56 in depressed position energizing motor 81 to propel roller 75 the length of plate 28 and apply transfer material 80 against the powder image thereon, drawing material from roll 92 overcoming the restraint of rolls 97 while held firm at its leading end between ejection rolls 130 and 131. Microswitches MS–3 and MS–8 held open by carriage 57 in retracted position are permitted to close as the carriage is propelled forward. When carriage 57 has reached its forwardmost position lip 49 secured thereto raises pawl 63 from MS–6 effecting release of solenoid 65 and permitting frame 52 to be upwardly inclined by action of spring 62 against the underside of bar rail 56 thereby permitting MS–1 to open de-energizing motor 81 while web 80, taut around roller 75, is stripped therewith upwardly away from xerographic plate 28 and with a powder image adhering thereto.

Microswitch MS–2, held open by protrusion 23 on rail 56 in depressed position, is permitted to close as rail 56 is raised which in series with closed microswitch MS–3, energizes motor 126 to transport web 80 between ejection rolls roller 130 and 131 at a speed determined by setting of rheostat 135. Simultaneously as rail 56 is raised microswitch MS–7 is closed by the up position of protrusion 21, which in series with closed microswitch MS–8 energizes fuser solenoid 115 causing fuser platen 113 to bear its heating surface 110 against moving web 80 effecting fusing of the xerographic powder image thereto.

While in transport, web 80 under tension and rolling around roller 75 causes the roller to slip free of its drive through clutch 84 drawing the roller and carriage restorably towing them to their retracted starting position. Before the carriage and roller have been fully retracted, microswitches MS–4 and MS–9 are closed through cam and follower arrangement 134 and 136 respectively. In retracted position boot 70 opens MS–3 and MS–8 but MS–4 and MS–9 function in lieu thereof to operate the ejection rolls and fuser platen 113 until the rotative position of cam 134 permits MS–4 and MS–9 to open de-energizing their respective circuits. In event the xerographic reproduction has reached only viewing window 19, whereas complete ejection from the apparatus is desired, manual advance thereof can be effected by depressing push button PB–51 which through push rod 138 and bar 137 closed MS–4 and MS–9 continuing transport of web 80 as before. Should multiple copies be desired of the one xerographic powder image while xerographic plate 28 is still in transfer relation, the transfer cycle can be repeated by depressing push button PB–50 energizing solenoid 65.

With the roller and carriage in retracted position handle 30 is rotated clockwise to restore plate 28 vertical in the focal plane of lens 3. Pulling handle 156 outwardly away from wall 12 permits microswitch MS–10 to close energizing motor 147 and causing brush 146 to rotate. With rotating brush 146 in physical contact with the photoconductive surface of xerographic plate 28 residue powder remaining is brushed into housing 154 from which it is exhausted by blower 149 to collection bag 155. The entire apparatus is then ready to effect another reproduction.

With the apparatus of the invention thus described the operations required from exposure to finished print can be completed in less than 15 seconds and is capable of satisfactorily recording radarscope images within the limits tolerable.

Since many changes could be made in the above construction and many apparently widely different embodiments of this invention could be made without departing from the scope thereof, it is intended that all matter contained in the drawings shall be interpreted as illustrative and not in a limiting sense.

What is claimed is:

1. Apparatus for xerographically reproducing copy onto a support surface web and using a xerographic plate having a photoconductive insulating surface, said apparatus comprising in combination a light-tight box-like structure in which are supported a lens element in one wall thereof, a first and second shaft each journaled for rotation about an axis parallel to the focal plane of the lens element, a third shaft supported parallel to said first and second shafts, a developing unit to form a powder image of an electrostatic latent image on a xerographic plate, a transfer unit to transfer a powder image from a xerographic plate to a support surface web held in the transfer unit, and fixing means to permanently affix a powder image to a support surface; plate-holding means arranged on said first shaft to support a substantially flat xerographic plate in the focal plane of the lens element, a plate charging unit fixed on said second shaft, means to rotate the second shaft to move the charging unit into and out of charging relationship with a xerographic plate, means while said charging unit is out of charging relationship to expose a charged plate to a light image of copy to be reproduced forming an electrostatic latent image thereof on the plate surface, means to rotate said first shaft in a first angular direction to move the plate into operative relation with the developing unit and then rotate said first shaft in a second angular direction to move the plate from said developing unit into operative relation with said transfer unit, means to move the image bearing support surface into operative relation with said fixing means, means to rotate the first shaft in said first angular direction to restore the plate into the focal plane position of the lens element, and plate cleaning means slidably secured on said third shaft to be advanced across the surface of a xerographic plate supported in said focal plane position.

2. Apparatus to transfer a powder image from a xerographic plate to a support surface web, said apparatus including in combination means to support a substantially flat xerographic plate on which a powder image has been previously formed, a supply roll to hold the support surface web to which a powder image is to be transferred, a first restraining means to restrain against drawing the web from its supply roll, web transport means intermittently operative which when inoperative acts as a second restraining means to restrain against drawing the web therefrom, a transfer roller supported in inoperative position substantially between the supply roll and a plate in its support means while the web from the supply roll extends through said first restraining means, partially around the transfer roller facing a plate on its support means and thence into said web transport means, means operative to effect image transfer which includes means to move the transfer roller on its support means from inoperative position into operative transfer relation pressing a web portion against the plate's image-bearing surface substantially at an end thereof, means effective in transfer relation to propel the roller over the plate surface for a predetermined distance toward an opposite end uniformly pressing thereagainst the web which is drawn from the supply roll overcoming the restraint of said first restraining means, means operative at the end of travel permitting the transfer roller and the web bearing a transferred image to separate from the xerographic plate, and means after separation to effect operation of the web transport means to move the image-bearing web away from the vicinity of the plate whereby the web movement restores the transfer roller to said inoperative position.

3. Apparatus to transfer a powder image from a xerographic plate to a support surface web, said apparatus including in combination means to support a substantially flat xerographic plate on which a powder image has been previously formed, a supply roll to hold a support surface web to which a powder image is to be transferred, web transport means intermittently operative, a transfer roller supported in inoperative position substantially between the supply roll and a plate in its support means while the web from the supply roll extends substantially taut partially around the transfer roller and thence into said web transport means, means operative to effect image transfer which includes means to move the transfer roller on its support means from inoperative position into operative transfer relation pressing a web portion against the plate's image-bearing surface substantially at an end thereof, means effective in transfer relation to propel the roller over the plate surface a predetermined distance toward the opposite end uniformly pressing the web thereagainst, means operative at the end of travel permitting the transfer roller and the web bearing a transferred image to separate from the xerographic plate, and means after separation to effect operation of the web transport means to move the image-bearing web away from the vicinity of the plate whereby web movement restores the transfer roller to said inoperative position.

4. Apparatus to transfer a powder image from a xerographic plate to a support surface web, said apparatus including in combination means to support a substantially flat xerographic plate on which a powder image has been previously formed, a supply roll to hold the support surface web to which a powder image is to be transferred, a first restraining means to restrain against drawing the web from its supply roll, said restraining means consisting of an upper and lower drag roll located adjacent to the supply roll and a lower drag roll located beneath and in pressure engagement with the upper drag roll, web transport means intermittently operative, said transport means including a pair of cylindrical rollers having their peripheral surface in pressure engagement whereby one of said rollers is driven and whereby when inoperative said transport means acts as a second restraining means to restrain against drawing web therefrom, a transfer roller supported in inoperative position substantially between the supply roll and a plate in its support means while the web from the supply roll extends through said drag rolls, partially around the transfer roller and thence into and between said web transport rollers, and means operative to effect image transfer which includes a solenoid means which when energized moves the transfer roller on its support means from inoperative position into operative transfer relation pressing a web portion against the plate's image-bearing surface substantially at an end thereof, motor means effective with the roller in operative position to propel the roller over the plate surface a predetermined distance toward the opposite end uniformly pressing thereagainst web which is drawn from the supply roll overcoming the restraint of said drag rolls, means at the end of travel which de-energizes the solenoid means permitting the transfer roller and web bearing a transferred image to separate from the xerographic plate, and means after separation to effect operation of the web transport means to move image-bearing web away from the vicinity of the plate whereby web movement restores the transfer roller to said inoperative position.

5. Apparatus to transfer a xerographic reproduction onto a support surface web from a powder image of the reproduction on a substantially flat xerographic plate, said apparatus including in combination means to support a xerographic plate on which a powder image has been previously formed, a supply roll to hold support surface web to which a powder image is to be transferred, web transport means intermittently operative, a transfer roller supported in inoperative position substantially between the supply roll and a plate in its support means while the web from the supply roll extends partially around the transfer roller and thence into said web transport means, fusing means to permanently affix a powder image to the web, said fusing means being disposed adjacent to the web approximately intermediate between said web transport means and said roller, means operative to transfer a xerographic reproduction which includes means to move the transfer roller on its support means from inoperative position into operative transfer relation pressing a web portion against the plate's image-bearing surface substantially at an end thereof, means effective in transfer relation to propel the roller over the plate surface a predetermined distance toward an opposite end uniformly pressing web thereagainst, means operative at the end of travel permitting the transfer roller and web bearing a transferred image to separate from the xerographic plate, means after separation to effect operation of the web transport means to move the image-bearing web past said fuser in fusing relation and whereby web movement restores the transfer roller to said inoperative position.

6. Apparatus to transfer a xerographic powder image reproduction onto a support surface web from a substantially flat xerographic plate, said apparatus including in combination means to support a substantially flat xerographic plate on which a powder image has been previously formed, a supply roll to hold support surface web to which a powder image is to be transferred, web transport means intermittently operative, a transfer roller supported in inoperative position substantially between the supply roll and a plate in its support means while the web from the supply roll extends partially around the transfer roller and thence into said web transport means, fusing means to permanently affix a powder image to the web, said fusing means being disposed adjacent to the web approximately intermediate between said web transport means and said roller, electric circuit means having a plurality of microswitches to effect a program of operations in related sequence to transfer a xerographic reproduction and which includes microswitches to render operative means to move the transfer roller on its support means from said inoperative position into operative transfer relation pressing a web portion against the plate's image-bearing surface substantially at an end thereof, means effective in transfer relation to propel the roller over the plate surface a predetermined distance uniformly pressing web thereagainst, means operative at the end of travel permitting the transfer roller and web bearing a transferred image to separate from the xerographic plate, and means after separation to effect operation of the web transport means to move image-bearing web past said fuser in fusing relation and whereby web movement restores the transfer roller to said inoperative position.

7. Apparatus for xerographically reproducing copy onto a support surface web and using a xerographic plate having a photoconductive insulating surface, said apparatus including in combination a light-tight box-like structure in which are supported a lens element in one wall thereof, a first and second shaft each journaled for rotation about an axis parallel to the focal plane of the lens element, a third shaft supported parallel to said first and second shafts, a developing unit to form a powder image of an electrostatic latent image on a xerographic plate, a transfer unit to transfer a powder image from a xerographic plate to a support surface web held on said transfer unit, said transfer unit having means to support a substantially flat xerographic plate on which a powder image has been previously formed, a supply roll to hold support surface web to which a powder image is to be transferred from the xerographic plate, web transport means intermittently operative, a transfer roller supported in pre-operative position substantially between the supply roll and a plate in its support means while the web from the supply roll extends partially around the transfer roller and thence into said web transport means, means operative to effect image transfer which includes means to move the transfer roller from pre-operative position on its support means into operative transfer relation pressing a web portion against the plate's image-bearing surface substantially at an end thereof, means in transfer relation to propel the roller over the plate surface a predetermined distance uniformly pressing web thereagainst, means operative at the end of travel permitting the transfer roller and web bearing a transferred image to separate from the xerographic plate, and means after separation to effect operation of the web transport means to move the image-bearing web away from vicinity of the plate whereby web movement restores the transfer roller to pre-operative position; fixing means to permanently affix a powder image to the web; plate-holding means arranged on said first shaft to support a xerographic plate in the focal plane of the lens element, a plate-charging unit fixed on said second shaft, means to rotate the second shaft to move the charging unit into and out of charging relationship with a xerographic plate, means while said charging unit is out of charging relationship to expose a charged plate to a light image of copy to be reproduced forming an electrostatic latent image thereof on the plate surface, means to rotate said first shaft in a first angular direction to move the plate into developing relation with the developing unit and then rotate said first shaft in a second angular direction to move the plate from said developing unit into transfer relation with said transfer unit, means to move an image-bearing support surface into fixing relation with said fixing means, means to rotate the first shaft in said first angular direction to restore the plate into the focal plane position of the lens element, and plate-cleaning means slidably secured on said third shaft to be advanced across the surface of a xerographic plate supported in said focal plane position.

8. Apparatus to transfer a xerographic powder image reproduction onto a support surface web from a substantially flat xerographic plate, said apparatus including in combination means to support a substantially flat xerographic plate on which a powder image has been previously formed, a supply roll to hold support surface web to which a powder image is to be transferred, motor driven web transport means intermittently operative, said transport means having a cam operative in conjunction therewith, a transfer roller suported in inoperative position substantially between the supply roll and a plate in its support means, whereby said roller is connected to a motor propellant means while the web from the supply roll extends partially around the transfer roller and thence into said web transport means, a first solenoid which when energized moves the transfer roller on its support means from inoperative position into operative transfer relation pressing a web portion against the plate's image-bearing surface substantially at an end thereof, a heat fuser means to permanently affix a powder image to the web, said heat fuser being disposed in prefusing relation adjacent to the web approximately intermediate between the web transport means and said roller, a second solenoid which when energized moves said heat fuser into fusing relation against the web, and electric circuit means connected to a potential source and which includes first and second microswitches open when the transfer roller is in inoperative position, third and fourth microswitches each acting when closed to energize said first solenoid, a fifth microswitch acting when closed to operate said transfer roller motor, propelling the roller over the plate surface a predetermined distance to uniformly press web thereagainst, a sixth microswitch in series with said first microswitch acting when both are closed to energize said second solenoid, a seventh microswtich in series with said second microswitch acting when both are closed to operate said web transport means, eighth and ninth microswitches shunting said first and second microswitches respectively whereby said eighth and ninth microswitches are opened and closed by said cam means in timed relation to the movement of web, said circuit being operative to effect a program of operations in related sequence initiated by setting a xerographic plate in its support means, said program consisting of momentary closing of said third microswitch from setting the plate on its support means to energize said first solenoid and initiating a related sequence for the operation of each of said other microswitches first causing said roller to be propelled while applying a length of web against the plate surface and second, de-energizing said first solenoid while energizing said web transport means and said second solenoid to advance said web portion bearing a transferred image and affix the transferred image thereto.

9. Apparatus for transferring a xerographic powder image from a xerographic plate to a support surface, said apparatus including in combination means to fixedly and securely support a xerographic plate on which a powder image has been previously formed, a transfer roller supported in an inoperative position spaced from a xerographic plate in its support means, a supply reel to support a web of support surface material, means sequentially operative to remove web from said supply reel in a path of movement that extends between said transfer roller and a plate in said plate support means, means to move said transfer roller from its inoperative position to an operative position at which the transfer roller urges a portion of web against a plate surface, means operative concomitantly with said transfer roller in said operative position to roll said transfer roller across a plate in said plate support means whereby to uniformly apply a length of web against the image-bearing surface of a plate, means to separate an applied length of web from a plate, and means operative after said last recited means to operate said web removing means.

10. Apparatus for transferring a xerographic powder image from a xerographic plate to a support surface, including in combination means to support a substantially flat xerographic plate on which a powder image has been previously formed, a transfer roller supported in a first position spaced from a xerographic plate in its support means, a supply reel to support a web of support surface material, means sequentially operative to remove web from said supply reel in a path of movement that extends between said transfer roller and a plate in said plate support means, said transfer roller being adapted to advance within said roller support means over a xerographic plate in said plate support means, means to move said transfer roller from said first position to a second position at which the transfer roller urges a portion of web against a plate surface, means operative concomitantly with said transfer roller in said second position to advance said transfer roller a predetermined distance within its support means whereby the advancing roller uniformly applies a length of web against the image-bearing surface of a plate to effect transfer, means after transfer to separate an applied length of web from a plate, and means operative after said last recited means to operate said web removing means.

11. Apparatus for transferring a xerographic powder image from a xerographic plate to a support surface, including in combination means to support a substantially flat xerographic plate on which a powder image has been previously formed, a transfer roller supported in a first position spaced from a xerographic plate in its support means, a supply reel to support a web of support surface material, means sequentially operative to remove web from said supply reel in a path of movement that extends between said transfer roller and a plate in said plate support means, said transfer roller being adapted to advance within said roller support means over a xerographic plate in said plate support means, means to move said transfer roller from said first position to a second position at which the transfer roller urges a portion of web against a plate surface, means operative concomitantly with said transfer roller in said second position to advance said transfer roller a predetermined distance within its support means whereby the advancing roller uniformly applies a length of web from the supply reel against the image-bearing surface of a plate to effect transfer, means after transfer to separate an applied length of web from a plate, means operative after said last recited means to operate said web removing means and means to effect operation of said transfer apparatus in timed relation to the placing of a xerographic plate on its support means.

12. Apparatus for transferring a xerographic powder image from a xerographic plate to a support surface, including in combination means to support a substantially flat xerographic plate on which a powder image has been previously formed, a transfer roller supported in a first position spaced from a xerographic plate in its support means, a supply reel to support a web of support surface material, means sequentially operative to remove web from said supply reel in a path of movement that extends between said transfer roller and a plate in said plate support means, drive means operatively connected to said transfer roller and effective when energized to propel said roller within said roller support means over a xerographic plate in said plate support means, means to move said transfer roller from said first position to a second position at which the transfer roller urges a portion of web against a plate surface, means operative concomitantly with said transfer roller in said second position to energize said drive means for a predetermined period whereby said roller while being propelled uniformly applies a length of web from the supply reel against the image-bearing surface of a plate to effect transfer, means after transfer to separate an applied length of web from a plate, and means operative after said last recited means to operate said web removing means.

13. In a xerographic apparatus including a light-tight box-like structure having a lens element in one wall thereof, means to support a substantially flat xerographic plate having a photo conductive insulating surface in the focal plane of the lens, charging means adapted to charge a xerographic plate prior to exposure while in said focal plane position, means following charging of the plate to project a radiation image of copy through said lens to the surface of the xerographic plate while in said focal plane position to form an electrostatic latent image of copy on the plate surface, developing means to form a powder image of the electrostatic image on the surface of the plate, and means to move a xerographic plate on its support means from said focal plane position into operative relation with said developing means for development, the improvement comprising, transfer means positioned within said box-like structure to transfer a developed image from a plate to a web support material and means to position a plate following development into operative relationship with said transfer means, said transfer means comprising material support means to support a supply of transfer web material, means to define a predetermined length of web from a supply of web material on said material support means to provide a support base for an image to be transferred, means to apply the predetermined length of web material against the plate surface bearing the powder image, means to separate the applied length of web material from the plate, and means operative after separation to advance the applied length of web from the vicinity of the transfer means.

References Cited in the file of this patent

UNITED STATES PATENTS

| | | |
|---|---|---|
| 165,420 | Knelles | July 13, 1875 |
| 2,624,652 | Carlson | Jan. 6, 1953 |
| 2,841,461 | Gleason | July 1, 1958 |
| 2,843,084 | Hayford | July 15, 1958 |
| 2,892,391 | Mayo et al. | June 30, 1959 |
| 3,009,402 | Crumrine et al. | Nov. 21, 1961 |

OTHER REFERENCES

IBM, Technical Disclosure Bulletin, vol. 1, No. 3, October 1958, pages 4 and 5.